Jan. 20, 1948.  C. G. HOLSCHUH ET AL  2,434,653
POWER-OPERATED AIRCRAFT GUN TURRET
Filed Oct. 24, 1941  5 Sheets-Sheet 1

INVENTORS,
C. G. HOLSCHUH,
and
BY  L. C. WARNER;
their ATTORNEY

Jan. 20, 1948.  C. G. HOLSCHUH ET AL  2,434,653
POWER-OPERATED AIRCRAFT GUN TURRET
Filed Oct. 24, 1941  5 Sheets-Sheet 2

INVENTORS,
C.G.HOLSCHUH,
and
L.C.WARNER,
BY Herbert H. Thompson
their ATTORNEY

Jan. 20, 1948. C. G. HOLSCHUH ET AL 2,434,653
POWER-OPERATED AIRCRAFT GUN TURRET
Filed Oct. 24, 1941 5 Sheets-Sheet 3

INVENTORS,
C.G. HOLSCHUH,
and L.C. WARNER;
BY Herbert H. Thompson
their ATTORNEY Jan. 20, 1948.    C. G. HOLSCHUH ET AL    2,434,653
POWER-OPERATED AIRCRAFT GUN TURRET
Filed Oct. 24, 1941    5 Sheets-Sheet 5

Fig. 8

INVENTORS.
C.G. HOLSCHUH,
and L.C. WARNER;
BY Herbert H. Thompson
their ATTORNEY.

Patented Jan. 20, 1948

2,434,653

UNITED STATES PATENT OFFICE 2,434,653

POWER-OPERATED AIRCRAFT GUN TURRET

Carl G. Holschuh, Glenhead, and Lester C. Warner, Jackson Heights, N. Y., assignors to Sperry Gyroscope Company, Inc., Brooklyn, N. Y., a corporation of New York Application October 24, 1941, Serial No. 416,290

13 Claims. (Cl. 89—37.5)

This invention relates to the art including power-operated gun turrets, especially for aircraft.

Up to the present time, the gunner on an airplane has had to manually manipulate his gun to direct it toward the target. This becomes quite inconvenient when the target has a position which may vary completely through 360° in azimuth, since the gunner can not move himself and his gun completely around without undue contortion and inconvenience.

According to the present invention, gun turrets are provided which swivel completely around 360° in azimuth under control of the gunner. The gunner himself is carried around by these turrets, the guns also being mounted in the turret and carried in azimuth by the turret. In elevation, the gun may be controlled independently of the turret, or, alternatively, the turret may also rotate in elevation, in which case the guns remain fixed with respect to the turret.

Accordingly, it is an object of the present invention to provide improved power-operated gun turrets for aircraft.

It is another object of the present invention to provide an improved gun turret for aircraft which may rotate completely through 360° in azimuth.

It is still another object of the present invention to provide an improved gun turret for aircraft adapted to carry a gunner within the turret.

It is a further object of the present invention to provide an improved gun turret adapted to contain a gunner, and having guns fixed within the turret, the turret being rotatable both in elevation and in azimuth.

It is still another object of the present invention to provide improved control apparatus for power-operated aircraft gun turrets.

Further objects and advantages of the present invention will become apparent from the following specification and drawings.

Figure 1:
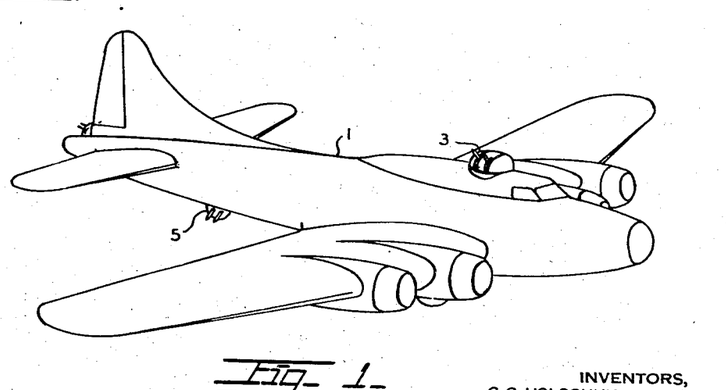
Fig. 1 shows a general view of an aircraft showing typical locations for the turrets of the present invention.

Referring to Fig. 1, reference numeral 1 indicates a general outline of an aircraft suitable for mounting the gun turrets of the present invention. On aircraft 1 is shown an upper turret 3 and a lower turret 5. As will be described below, the upper turret 3 is adapted to rotate completely around 360° in azimuth, while the guns, being carried in azimuth with the turret, are independently rotated in elevation under control of the gunner, who is situated within the turret and is carried in azimuth with the turret. Lower turret 5 is also rotatable through 360° in azimuth, and is furthermore rotatable through 90° in elevation, under control of the gunner who is carried by and revolves with the turret both in elevation and azimuth. The guns here are fixed with respect to the turret.

Figure 2:
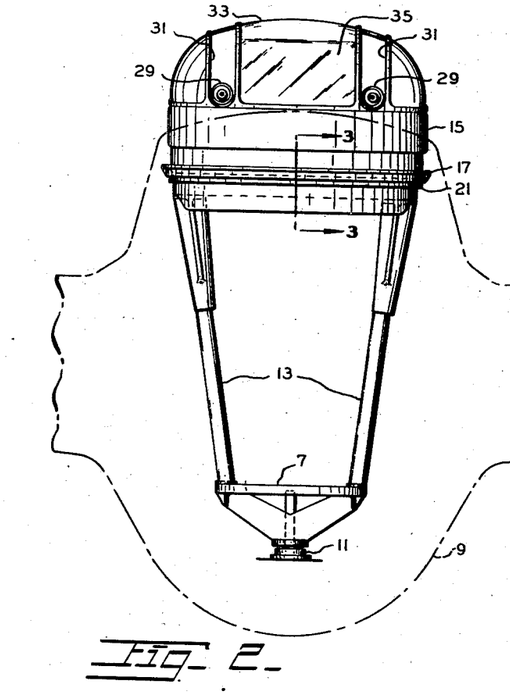
Fig. 2 is an elevational view partly in cross section of a typical upper turret of the present invention.

Referring to Fig. 2, which shows an elevation view of the upper turret, a rotatable platform 7 is mounted on the craft 1 shown in outline by dotted line 9, as by a thrust bearing 11. Platform 7 is adapted to support the gunner, who stands thereon. Platform 7 also supports the entire turret and gun mechanism. Thus, struts 13 are provided, fastened at one end to platform 7 and carrying the turret and turret control mechanism at their other end. The turret mechanism is mounted in a supporting housing or ring 15. A further supporting member 17 is rigidly fastened to the aircraft and carries a roller bearing surface 19 and an azimuth gear 21. Pivoted in housing 15 are rollers, one of which is shown as 23 in Fig. 3, which are adapted to roll on the fixed roller bearing surface 19 and thereby prevent lateral movement of the turret without hindering rotation. Meshing with azimuth gear 21 is the azimuth driving pinion 25 pivoted within casing 15, as about an axis 27. As will be described, rotation of azimuth pinion 25 under control of the gunner causes the entire turret to rotate in azimuth.

Supported in the upper portion of the turret are the guns 29, shown in this instance as two in number. Guns 29 are adapted to rotate in elevation about a horizontal axis within gun slots 31 provided in the upper portion or hood 33 of the turret. Hood 33 is made of bullet proof transparent material, which may, for instance, be the material known commercially as "Plexiglas," and thereby permits the gunner a wide field of observation. A portion 35 of hood 33 located between the guns 29 is made of flat transparent material in order that no optical distortion of the line of sight will be caused. During operation of the turret, the gunner stands on platform 7 with his head within hood 33 between guns 29 and opposite flat portion 35.

Figures 4, 10:
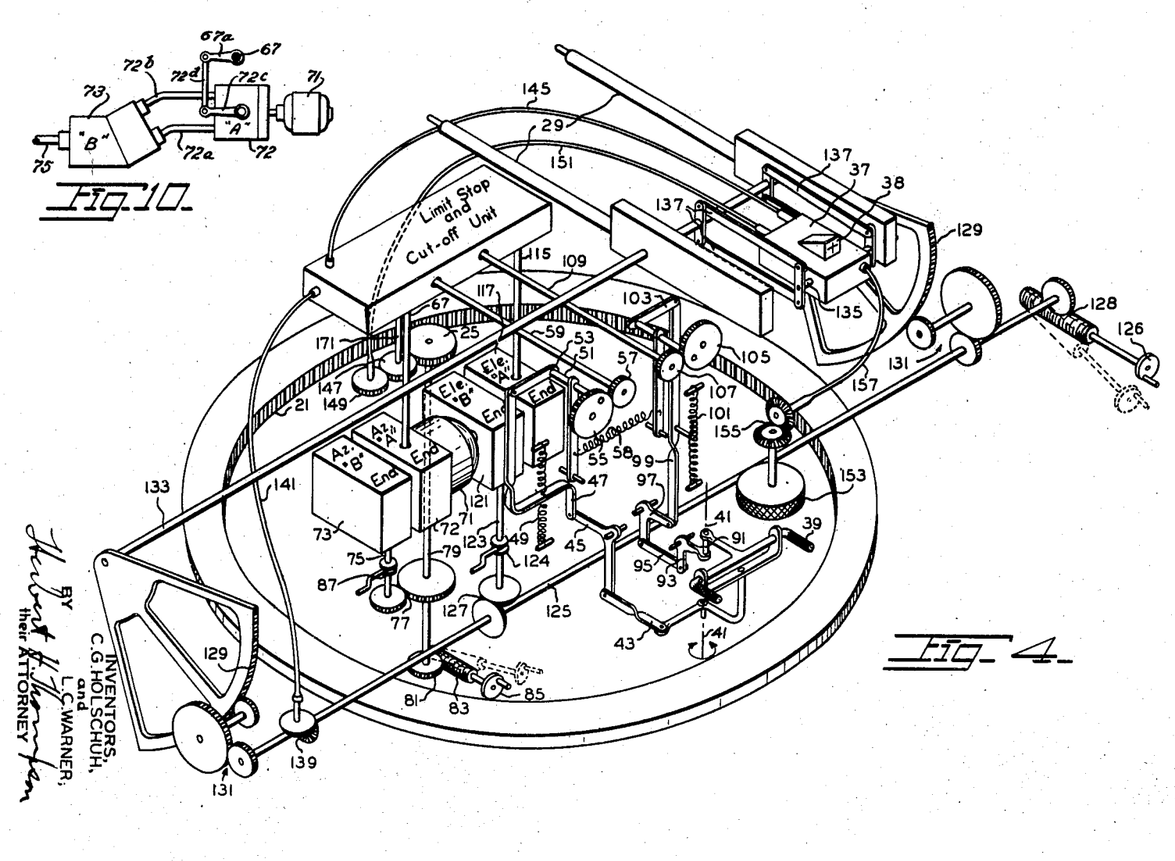
Fig. 4 shows a perspective schematic view of a suitable form of turret control for the turret of Fig. 2.
Fig. 10 schematically illustrates a variable speed hydraulic transmission unit or servo.

Also located between guns 29 is the computing gun sight 37 as shown in Fig. 4. This sight-computer may be and preferably is of the form shown in copending Holschuh-Vielehr application Serial No. 358,382, filed September 26, 1940, and which matured into United States Patent No. 2,396,701, issued March 19, 1946, in which the position of the sight in elevation and azimuth corresponds to actual gun elevation and gun azimuth, while the optical axis of the sight is offset from the sight position by the computed gun corrections. Gun sight 37 has its optic 38 placed at the eye level of the gunner.

Below guns 29 and gun sight 37 is the control unit comprising a handle-bar type control 39 adapted to be rotated both in azimuth and in elevation. Rotation of handle-bars 39 in azimuth about axis 41 as shown by the arrow in Fig. 4 will cause translation of link 43, thereby actuating a crank 45 and translating a further link 47. Connected to link 47 is a spring centralizing device 49 of any suitable type, which acts to return the handle bar control 39 to its neutral or zero position when released by the gunner. Translation of link 47 causes a rotation of shaft 51 by means of crank arm 53. Connected to the end of shaft 51 is a gear 55 mounted eccentrically thereon. Gear 55 meshes with a gear 57 and thereby rotates a shaft 59 in response to actuation of the control 39. Gear 55 is kept in engagement with gear 57 by a spring 58.

Eccentric gear 55 mating with gear 57 provides a type of non-linear motion transmitting device by increasing the ratio of the rotation of gear 57 to the displacement of link 47 thereby increasing the rate at which the velocity of the turret increases as the displacement of control handles 39 increases. These gears are so adjusted that a given displacement of control 39 provides a small change in turret velocity when near the zero azimuth rate position, and a large change when the turret is moving rapidly. Thus the gunner is provided with a sensitive and accurate control for tracking purposes, as well as a rapid control for slewing where sensitivity is not needed.

Figure 5:
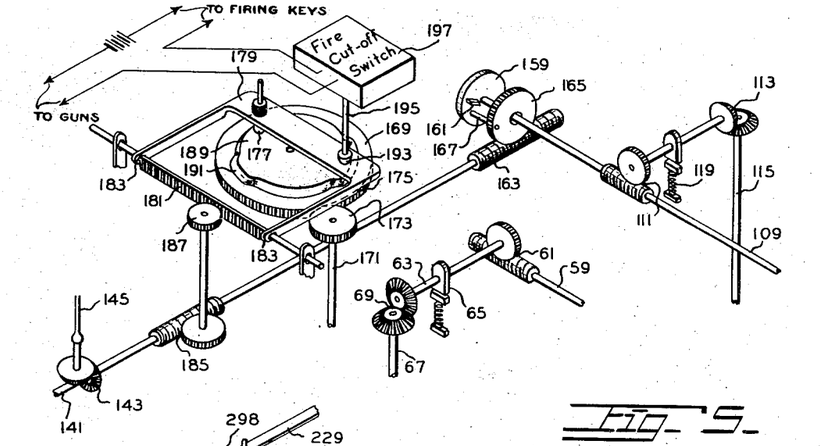
Fig. 5 shows a schematic perspective view of the limit stops and fire cut-off device of Fig. 4.

Referring to Fig. 5, wherein the fire cut-off and limit-stop unit is shown more in detail, it will be seen that shaft 59 is connected to a worm and worm wheel arrangement 61 whereby it rotates shaft 63. Connected to shaft 63 is a detent mechanism 65 which merely serves to indicate to the operator when the control is in the central or zero position by means of the tactile resistance offered to displacement of the control 39 from this position. Shaft 63 actuates a further shaft 67 through beveled gearing 69. Shaft 67 thereupon controls the A-end 72 of a conventional variable speed hydraulic transmission unit of the "Vickers" type driven by a motor 71. For a description of one form of drive suitable for this purpose, reference may be had to Patent No. 2,189,823, issued February 13, 1940, to H. P. Vickers et al.

For illustrative purposes, we have shown in Fig. 10 a schematic representation of one form of hydraulic servo which may be employed in the present invention. This type of servo comprises an "A-end" and a "B-end," indicated generally at 72 and 73, respectively. The A-end constitutes a variable displacement fluid pump which is driven by the electric motor 71, preferably of a constant speed type, and the B-end comprises a hydraulic motor which is driven by the fluid delivered from the A-end through the connecting pipes 72a and 72b. The interior construction of the A-end may be best understood by referring to U. S. Patent No. 2,177,098, issued to T. B. Doe et al., and includes a tilting box which is movable to vary the displacement of the pump cylinders. In Fig. 10, the displacement of the pump is varied by means of the lever 72c which is connected by means of link 72d with a crank arm 67a which is secured to the operating shaft 67. In other words, an actuation of the handlebar control 39 about the axis 41 will effect rotation of control shaft 67 in one direction or the other thereby varying the magnitude of displacement of the cylinders within the A-end of the hydraulic servo. It will be understood that movement of the lever arm 72c from a neutral position in which the pump delivers zero output and in one direction or the other will cause the B-end of the servo to drive in one direction or in the opposite direction.

The output of the B-end 73 of the Vickers unit rotates a shaft 75 which, through clutch 87 and gearing 77, actuates a further shaft 79. Connected to shaft 79 is the azimuth pinion 25 which meshes with the azimuth gear 21 and thereby rotates the entire turret in azimuth. Also connected to shaft 79 is a worm wheel 81 which is adapted to be engaged by a disengageable worm 83 driven by hand wheel 85. Hand wheel 85 thereby provides a manual control of the turret in azimuth should the hydraulic apparatus be ineffective for any reason. Worm 83 also acts as a turret lock when engaged. Clutch 87 is provided to disconnect the hydraulic apparatus when manual control is used.

Rotation of control handles 39 in elevation causes a reciprocation of link 91 which thereby rotates crank 93 and actuates a link 95. Link 91 is rotatably fastened to controls 39 to permit rotation in azimuth. Link 95 rotates a crank 97 and thereby actuates link 99. A centralizing device 101 similar to 49 is provided for link 99 to insure that the control handles 39 will return to their neutral or zero elevation position when released by the gunner. Link 99 operates, through crank 103, eccentric gear 105 and mating gear 107, to rotate a shaft 109. Eccentric gear 105 provides a non-linear motion transmitting device, similar to gear 55, and is urged against its mating gear 107 by spring 58. Shaft 109, through worm and worm wheel 111, and beveled gear 113, actuates control shaft 115 which, in turn, controls the A-end 117 of the elevation Vickers unit, driven from the same motor 71 as the azimuth Vickers unit. A detent mechanism 119 is provided similar to detent 65.

The output of the B-end 121 of the elevation Vickers unit actuates a shaft 123 and thereby rotates a shaft 125 as through clutch 124 and beveled gearing 127. Shaft 125 is adapted to turn two gear sectors 129 through gearing 131. Connected to the common shaft 133 of gear sectors 129 are the guns 29. Hence, rotation of the control handle-bar 39 will operate to rotate guns 29 in elevation about shaft 133.

A handwheel 126 is provided for manual control of the turret in elevation if desired. This handwheel 126 actuates shaft 125 through worm and worm wheel 128. Worm 128 is adapted to disengage its worm wheel when control unit 39 is in use, and provides a turret lock when engaged.

In view of the use of these Vickers variable speed units, it will be seen that a displacement of the control unit 39 represents a change in the velocity or rate of motion of the guns in elevation or azimuth. Therefore, the handle-bar control unit 39, both in azimuth and elevation, represents a rate control of the guns 29.

Mounted on fixed supports (not shown) between guns 29 is the gun sight and computer 37. Gun sight 37 is adapted to be rotated by the shaft 135 by means of linkages 137 connecting it with shaft 133. As the gun is rotated in elevation by shaft 133, the gun sight and computer unit 37 is correspondingly rotated by the shaft 135, which is parallel to the shaft 133. In this way, the gun sight and computer unit 37 is rotated in elevation together with guns 29 and is maintained parallel to guns 29 at all times. The elevation data necessary for the computer is obtained from shaft 125 by means of beveled gears 139, flexible shaft 141, beveled gears 143, and flexible shaft 145, which connects directly into sight 37. The azimuth data necessary for the sight 37 is obtained from shaft 79 through pinion 25, pinion 147, pinion 149, and flexible shaft 151, which connects into the sight 37. The range data necessary for sight 37 is obtained from a range control knob 153 located between handle bars 39 and adapted to be actuated by the thumbs of the gunner, whose hands are clasping the handle bars of control 39. The range knob 153 is connected into sight 37 by means of beveled gears 155 and flexible control shaft 157. In this way, the data necessary for computation of prediction and ballistic corrections within the sight 37 are provided.

Sight 37 is preferably of the type shown in application Serial No. 358,382, now U. S. Patent No. 2,396,701, in which the optical line of sight deviates from the actual gun orientation by the corrections needed to assure proper training of the guns. Hence, in operating the turret, the gunner merely keeps the target centered on his sight optic by manipulation of controls 39 and 153. In this way, the guns 29 are correctly oriented toward the future position of the target, and are compensated for the necessary ballistic corrections.

Since the turret is adapted to rotate completely through 360° in azimuth, no limit stops are necessary in azimuth. However, in elevation, the gun has only a restricted angular travel or a predetermined range of movement, which is approximately between zero elevation and 90° elevation. In order to assure that the gun will not injure its mounting at the extremes of its travel, it is necessary to provide means to cause the gun to be stopped before reaching the absolute extremes of travel. This mechanism is shown in Fig. 5.

As has been described, shaft 109 is rotated in accordance with the rotation of control unit 39 in elevation, and controls the A-end of the elevation Vickers unit. It therefore represents by its angular position the angular rate of change of gun elevation. As has also been described, shaft 141 is rotated by shaft 125 which represents the actual elevation of the gun. As shown in Fig. 5, shaft 109 is connected directly to a plate 159 which carries a projection 161. Shaft 141 is connected to a worm 163 which rotates a worm wheel 165 also carrying a projection 167. Projections 161 and 167 are adapted to contact one another when plate 159 and worm wheel 165 are properly positioned.

In operation, the various gear ratios are so adjusted that worm wheel 165 can attain the position corresponding to zero elevation or 90° elevation only when projection 161 is in the position corresponding to zero elevation rate. If projection 161 is not in a position corresponding to zero elevation rate, then as the elevation of the gun increases to 90°, or decreases to zero degrees, projection 167 will engage projection 161 and will carry projection 161 and therefore shaft 109 and shaft 115 to the position corresponding to zero elevation rate. Since shaft 115 is directly coupled to the control member in the A-end of the Vickers elevation unit, it will be seen that in this way the action of the guns in reaching its extreme positions, zero or 90°, actually causes the guns to slow down and stop before reaching their absolute extreme positions. However, it is still possible to move the guns in the reverse direction at full rate, since actuation of controls 39 to full opposite rate immediately moves projection 161 away from 167, and no hindrance exists until projection 167 has moved around in the opposite direction to again engage 161, at the position corresponding to the opposite permissible limit.

In addition to the above safety feature, it is desirable to cut off the fire of the guns when the guns are oriented within certain sectors of the hemisphere in which the guns can be oriented, in order that the gun fire shall not strike protruding portions of the aircraft. For this purpose, a plate 169 is oriented in azimuth under control of the azimuth servo of the turret by means of a pinion 147 meshing with the azimuth pinion 25 and actuating a shaft 171 which drives the plate 169 through a pinion 173 meshing with gear teeth 175 formed on or fastened to plate 169. The upper portion of plate 169 is formed in effect as a cam surface on which a cam follower 177 rests. Cam follower 177 is adapted to be translated along a diameter of plate 169 by means of bracket 179 connected to a rack 181 by means of rotatable joints 183. In this way, cam follower 177 will be translated along a diameter of plate 169 under control of rack 181. Rack 181, in turn, is actuated in accordance with gun elevation by means of shaft 141, worm and worm wheel 185, and pinion 187. Therefore, the position of cam follower 177 with respect to plate 169 is in a one-to-one correspondence with the orientation of the gun in space.

Plate 169 is formed to be generally flat except for certain raised portions 189, joined to the flat portion by a suitable bevel 191. The raised portion 189 is formed to correspond to those sectors of the hemisphere of possible gun orientations in which it is desired that gun-fire should be cut off. The firing of guns 29 is controlled electrically by means of solenoids (not shown) energized by a battery 190 under the control of firing keys mounted on the control handles 39. The raising of cam follower 177 upon raised portion 189 of plate 169 in response to orientation of the gun within the particular sector in which gun-fire is to be cut off causes a pin 193, which rides on bracket 179, to be lifted, thereby reciprocating shaft 195 and actuating sealed switch 197 which interrupts the firing circuit of the fire solenoid connected to the guns. In this way, gun-fire is cut off in response to orientation of the guns within certain specified or predetermined sectors. If desired, a depressed portion could be substituted for raised portion 189, also actuating switch 197 as before.

In operation, the control handle 39 is adjusted by the operator to bring the sight 37 onto a target. Movements of the control handle cause the Vickers unit to move the turret and the guns in azimuth and to adjust the elevation of the guns relative to the turret. Orientation and rate data supplied to the sight 37 is utilized to compute a lead angle and adjust the optic 38 to offset the line of sight relative to the guns, although the unit 37 and the guns remain in parallel positions at all times. The operator may fire the guns whenever he is "on" the target unless there is danger of hitting a protruding portion of his own ship, in which case the firing circuit is interrupted by the cam-operated switch 197. When the gun approaches the limit of its movement in elevation, its velocity is gradually decreased by the co-action of projections 161 and 167 to reduce the speed at which the Vickers unit drives the guns.

Figure 3:
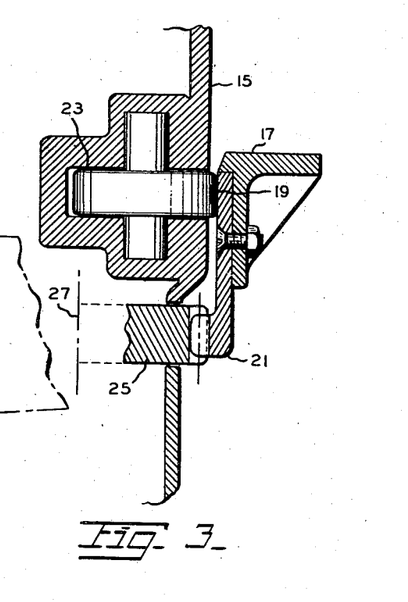
Fig. 3 is a cross sectional detail of Fig. 2 taken along lines 3—3 thereof.
Figures 6, 7:
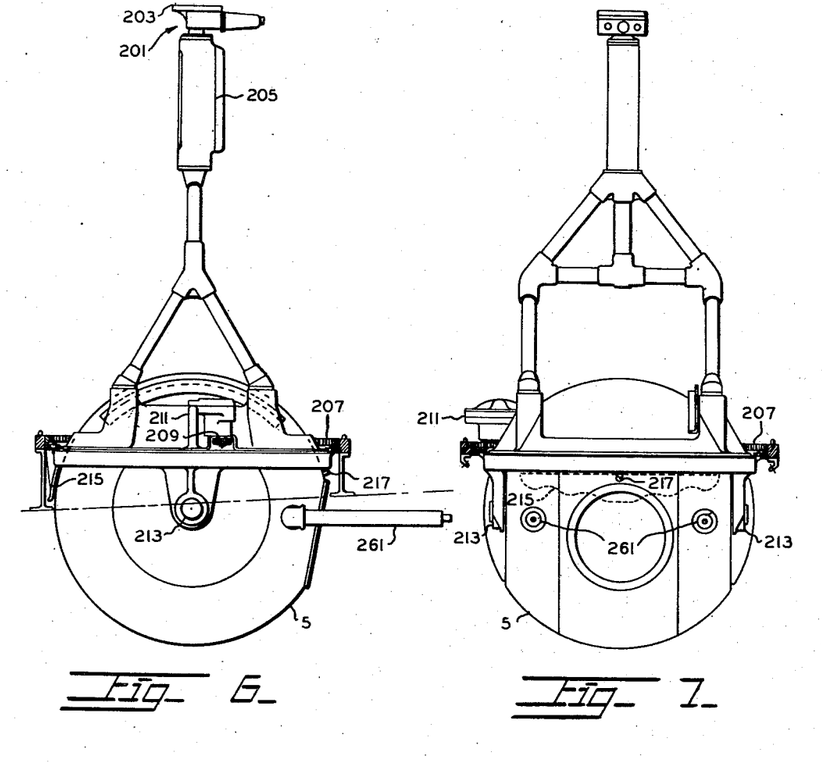
Figs. 6 and 7 show two elevational views taken at right angles to one another of a typical lower turret of the present invention.

Referring now to Figs. 6-9 which show features of the lower, or ball, turret 5, Figs. 6 and 7 show the means for supporting the ball turret 5. A rotatable support 201 has one portion 203 rigidly fastened to the aircraft and hanging therefrom is a rotatable supporting structure 205 adapted to support the entire ball unit. An azimuth gear 207 and roller arrangement similar to that shown in Fig. 3 is also provided. In this case, the azimuth gear 207 is completely outside the turret. The azimuth pinion 209 which drives the turret with respect to azimuth gear 207 is connected to the control mechanism inside the turret by means of shafts and gearing indicated generally at 211 which pass through the hollow trunnion mounting 213 of the turret. Turret 5 is adapted to be rotated in elevation about the trunnions 213 and in azimuth within azimuth gear 207. At the outside of turret 5 is placed a cam member 215 which is adapted to actuate the fire cut-off switch whenever the turret position corresponds to the zone of undesired gun fire. The actuating mechanism is not shown in detail, but operates from a pin 217 which is adapted to be actuated by cam member 215 when the turret moves into the zone of undesired gun-fire.

Figure 8:
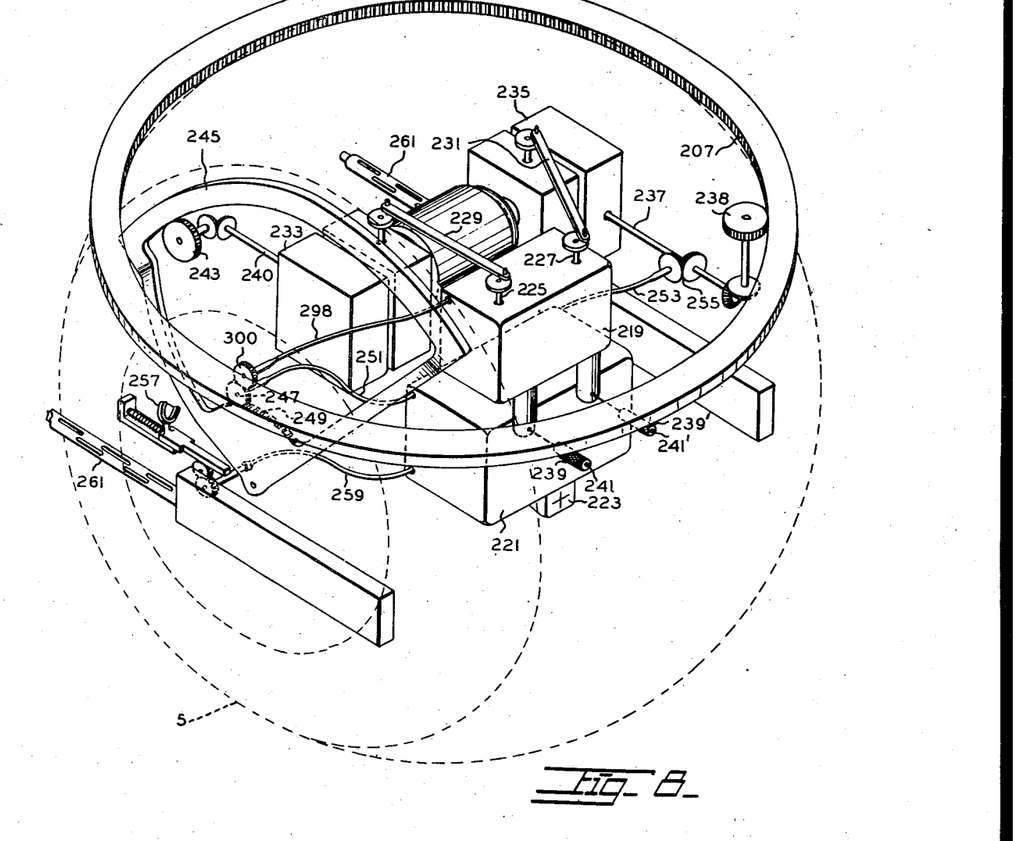
Fig. 8 shows a schematic view of a control system suitable for the lower turret of Figs. 6 and 7.

Referring to Fig. 8, the control handles 239 and 239' having the firing keys 241 and 241', respectively, at their ends are shown mounted from a control unit 219. Control unit 219 is placed immediately above the gun sight and computer 221 having an optic 223. The output of control unit 219 in elevation is obtained from shaft 225 and in azimuth from shaft 227. These shafts are shown schematically coupled as by links 229 and 231 to the respective A-ends of the elevation and azimuth Vickers variable speed units 233 and 235. The output of the azimuth Vickers unit 235 rotates a shaft 237 and thereby actuates azimuth pinion 238, which meshes with azimuth gear 207 and thereby drives the turret 5 in azimuth. The output of the elevation Vickers unit 233 actuates a shaft 240 and thereby actuates the elevation pinion 243 which engages a fixed elevation gear sector 245 and thereby drives the turret in elevation.

The elevation data for the sight 221 is obtained from a pinion 247 engaging a gear sector 249 connected to gear sector 245, and thereby transmits its motion through flexible shaft 251 to the sight 221. The azimuth data is transmitted to the sight 221 by means of flexible shaft 253 coupled to shaft 237 as by beveled gears 255. The range data for sight 221 is obtained from the range control foot pedal 257 which transmits its data to sight 221 through a flexible shaft 259.

Guns 261 are rigidly mounted within turret 5 and moved with turret 5 both in elevation and azimuth. The gunner is positioned within the turret 5 with his eye opposite the optic 223, and his hands grip controls 239 and 239' over his head, with his thumbs placed over the firing keys 241 and 241'. The range control 257 is actuated by the gunner's foot.

The actual mechanism for controlling turret 5 is very similar to that shown in Fig. 4 and is indicated only schematically here. The control unit 219 is shown more in detail in Fig. 9. The two control handles operate identically to control the movements of the turret. Hence a description of the mechanism associated with the handle 239 will suffice for both handles 239 and 239'. Here control handle 239 is fastened to a pinion 263 which meshes with a circular rack 265. Hence rotation of control handle 239 about horizontal axis 267 causes reciprocation of shaft 269 fastened to rack 265 and thereby, through a second circular rack and pinion 271, rotates shaft 273. Coupled to shaft 273 as by gearing 275 is shaft 277 which carries a yoke or clevis 279 in which rides a pin 281 connected, in turn, to a crank arm 283. The centers of clevis 279 and crank 283 are displaced, whereby rotation of shaft 277 produces a corresponding but non-linearly related rotation of shaft 285 connected to crank 283, thereby obtaining sensitive control for tracking and rapid control for slewing, as in the upper turret. A centralizing unit 289 is provided to assure that the control handle 239 will return to the position of zero elevation rate when released.

Figure 9:
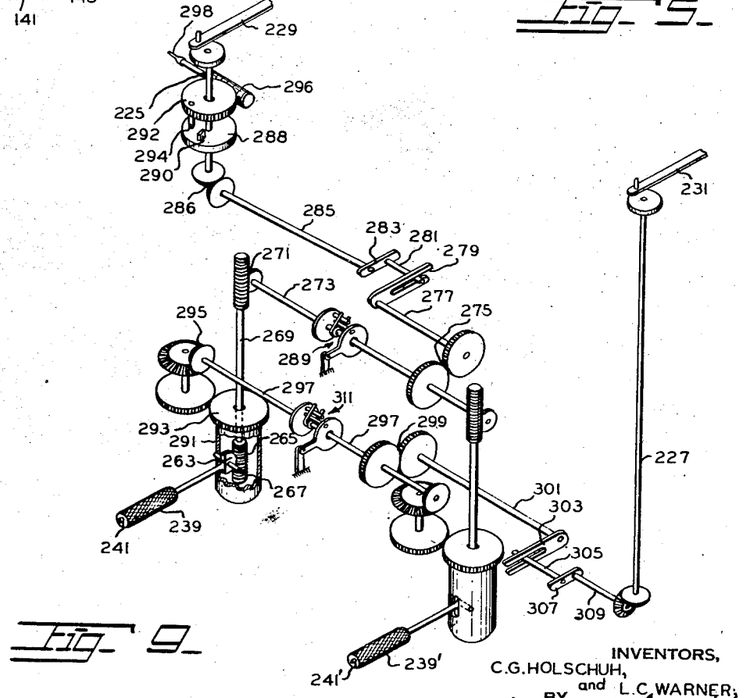
Fig. 9 shows a detailed schematic view of the limit stops and control unit for the control system of Fig. 8.

Shaft 285 is connected to a shaft 225 by gearing 286. Shaft 225 transmits its motion to link 229, which controls the elevation Vickers unit A-end and thereby controls the rate of rotation of turret 5 in elevation.

Also fixed to shaft 225 is a plate 288 carrying a projection 290, which form one part of an elevation limit stop similar to that shown in Fig. 5. Riding freely on shaft 225 is a second plate 292 also carrying a projection 294 adapted to engage projection 290. Plate 292 is formed as a worm wheel, and is driven by a worm 296 which is driven in turn by a flexible shaft 298 which rotates in accordance with gun elevation, being driven by pinion 300 meshing with pinion 247. As explained above, this elevation stop unit serves to reduce the turret elevation rate to zero as the limits of its traverse in elevation are approached.

Rotation of control handle 239 in azimuth causes the rotation of the casing 291 surrounding circular rack 265 and thereby rotates gear 293 connected to housing 291. This rotates, through gearing 295, a further shaft 297 to which is coupled, as by gearing 299, to a shaft 301 carrying clevis 303 in which pin 305 slides. Crank 307 fastened to pin 305 operates to rotate shaft 309 and thereby control the azimuth A-end of the Vickers unit through shaft 227 and link 231. A spring centralizing device 311 is also inserted in shaft 297. Clevis 303, pin 305, and crank 307 operate to yield a non-linear relationship between the rotations of shaft 301 and 309 in much the same fashion as eccentric gear arrangements 55 and 105 in Fig. 4.

The operation of the ball turret is similar to the previously described operation of the upper turret. Control handles 239 and 239' are adjusted by the operator to move the turret in azimuth and in elevation in a manner to direct the line of sight from the optic 223 toward the target. Movements of the handles about vertical and horizontal axes control the Vickers unit to drive the turret in azimuth and elevation. As the turret approaches the limit of its elevation movement, projections 290 and 294 co-act to gradually reduce the speed of the Vickers unit. Cam member 215 automatically opens the firing circuit to prevent the guns from firing when there is danger of hitting a portion of the craft in which they are mounted. Orientation and rate data are supplied to the sight and computer unit 221 and are utilized therein to compute a lead angle by which the optic 223 is adjusted to offset the line of sight relative to the axis of the guns. Thus the operator within the turret moves the entire turret, including the guns, the sight, and himself, to aim the guns at the target.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what is claimed is:

1. A power operated gun mounting comprising a support, a gun carried by said support and adjustable relative thereto, driving means for positioning said gun throughout a predetermined range of movement, a device for controlling the speed of said driving means, and means for automatically controlling the speed of said driving means, said last mentioned means including two cooperable and normally independently positionable members, a first thereof being connected with said device and positioned in accordance with the speed of said driving means and the second being connected to move with said gun and to be positioned in accordance with gun position, said second member being adapted to engage and move said first member to reduce the speed of said driving means while movement of said gun through an end zone of said range and toward one end thereof occurs.

2. A power operated gun mounting comprising a support, a gun carried by said support and adjustable relative thereto, driving means for positioning said gun throughout a predetermined range of movement, a device for controlling the speed of said driving means, and means for automatically adjusting said device to control the speed of said driving means, said last-mentioned means including two cooperable and normally independently positionable members, a first thereof being connected with said device and positioned in accordance with the speed of said driving means and the second being connected to move with said gun and to be positioned in accordance with gun position, said second member being adapted to engage and move said first member to reduce the speed of said driving means while movement of said gun through an end zone of said range and toward one end thereof occurs.

3. A power operated gun mounting comprising a rotatably mounted turret, a gun carried by said turret, driving means for positioning said gun throughout a predetermined range of movement, a device for controlling the speed of said driving means, a first means connected with said device for operating the same, and a second means movable with said gun for automatically operating said device, said second means including two cooperable and normally independently positionable members, means for connecting a first of said members with said device whereby to be positioned in accordance with the speed of said driving means, and means for connecting the second member to move with said gun whereby to be positioned in accordance with gun position, said second member being adapted to engage and move said first member to reduce the speed of said driving means while movement of said gun through an end zone of said range and toward one end thereof occurs.

4. A power operated gun mounting comprising a rotatably mounted gun turret, driving means for rotating said turret, means for controlling the rate of said driving means comprising a control device movable through a displacement range and transmission means for effecting progressively greater changes in the rate of said driving means per unit of displacement of said device as said device is moved in one direction through said range, and means for automatically controlling the speed of said driving means, said last-mentioned means including two cooperable and normally independently positionable members, a first thereof being connected with said device and positioned in accordance with the speed of said driving means and the second being connected to move with said gun and to be positioned in accordance with gun position, said second member being adapted to engage and move said first member to reduce the speed of said driving means while movement of said gun through an end zone of said range and toward one end thereof occurs.

5. A power operated gun mounting comprising a rotatably mounted gun turret, driving means for rotating said turret, means for controlling the rate of said driving means, a displaceable control device and a gear transmission connected between said device and last-mentioned means, said transmission including an eccentrically mounted gear, a gear adapted to mesh therewith, and means for maintaining said gears in mesh during rotation thereof.

6. A power operated gun mounting comprising a rotatably mounted turret, a gun carried by said turret, driving means for positioning said gun throughout a predetermined range of movement, a device for controlling the speed of said driving means, a first means connected with said device for operating the same, and a second means movable with said gun for automatically operating said device, said second means including two cooperable and normally independently positionable members having a common axis of rotation, means for connecting a first of said members with said device whereby to be positioned in accordance with the speed of said driving means, and means for connecting the second member to move with said gun whereby to be positioned in accordance with gun position, said second member being adapted to engage and move said first member to reduce the speed of said driving means while movement of said gun through an end zone of said range and toward one end thereof occurs.

7. A power operated gun mounting comprising a rotatably mounted turret, a gun carried by said turret, driving means for positioning said gun throughout a predetermined range of movement, a device for controlling the speed of said driving means, a first means for operating said device, and a second means movable with said gun for automatically operating said device, said second means including two cooperable and normally independently positionable members, means for connecting a first of said members and said first device-operating means in parallel and to said device in motion-transmitting relation, said first member being thereby positioned in accordance with the speed of said driving means, and means for connecting the second member to move with said gun whereby to be positioned in accordance with gun position, said second member being adapted to engage and move said first member to reduce the speed of said driving means while movement of said gun through an end zone of said range and toward one end thereof occurs.

8. In power operated devices, a positionable object, variable speed driving means for moving said object throughout a predetermined range of movement, an actuatable device for controlling the speed of said driving means in accordance with the actuated position thereof, a first control means for normally controlling said device and a second control means for automatically controlling said device to control the speed of said driving means during movement of said object in the end zones only of its range of movement, said second control means including two cooperable and normally independently positionable members, means for connecting a first of said cooperable members with said device to position said member in accordance with the speed of said driving means and, reciprocally, to actuate said control device when said member is moved and means for positioning the second of said cooperable members in accordance with the position of said object, said second member being adapted and arranged to engage and move said first member whereby to reduce the speed of said driving means while movement of said object through an end zone of said range and toward one end thereof occurs, said members actuating said device to its zero speed position when said object lies adjacent the end of its range of movement.

9. In power operated devices, a positionable object, variable speed driving means for positioning said object throughout a predetermined range of movement, an actuatable device for controlling the speed of said driving means, manually operable means for actuating said device and means for automatically controlling said device to control the speed of said driving means during movement of said object in the end zones only of its range of movement, said second control means including two cooperable and normally independently positionable members, means connecting a first of said members with said device to position said member in accordance with the speed of said driving means and reciprocally, to actuate said control device when said member is moved, and means for connecting the second of said members to move with said object whereby to position said second member in accordance with said object's position, said second member being adapted and arranged to engage and move said first member whereby to reduce the speed of said driving means while movement of said object through an end zone of said range and toward one end thereof occurs, said members actuating said device to its zero speed position when said object lies adjacent the end of its range of movement.

10. In power operated devices, a positionable object, variable speed driving means for moving said object throughout a predetermined range of movement, a control device for controlling the rate of said driving means, a first control means movable through a displacement range and transmission means connecting said control means and control device for effecting progressively greater changes in the rate of said driving means per unit of displacement of said control means when said control means is moved in one direction through said range, and means for automatically controlling the rate of said driving means during movement of said object in the end zones only of its range of movement, said last-mentioned means including two cooperable and normally independently positionable members, means connected with said transmission means for positioning a first thereof in accordance with the speed of said driving means and, reciprocally, to actuate said control means through said transmission means when said member is moved, and means for positioning the second of said members in accordance with the position of said object, said second member being adapted and arranged to engage and move said first member to reduce the speed of said driving means while movement of said object through an end zone of said range and toward one end thereof occurs, said members actuating said device to its zero speed position when said object lies adjacent the end of its range of movement.

11. In power operated devices, variable speed driving means for moving an object, a settable member for varying the speed of said driving means, a control device movable through a displacement range, and transmission means connecting said control device to said settable member, said transmission means including an eccentrically mounted gear, a gear adapted and arranged to mesh therewith, and means for maintaining said gears in mesh during rotation thereof, said transmission means being so constructed and arranged as to effect progressively greater changes in the speed of said driving means per unit of displacement of said control device as said device is moved in one direction through said range.

12. A power operated gun mounting comprising a rotatably mounted gun turret, reversible hydraulic driving means therefor comprising a hydraulic motor connected to drive said turret and a reversible, variable displacement pump for supplying fluid to said motor, a rotatable controller for reversing and varying the displacement of said pump having a substantially fixed ratio of output speed of said motor in either direction to displacement of said controller from a central zero speed reference position, a rotatable manual control rotatable throughout a displacement range from a central zero speed reference position, and a reversible, non-linear motion transmitting means for effecting a positive drive of its output in accordance with operations of said manual control in either direction of rotation and for providing a progressively greater ratio of displacement in its output to displacement of its input as said manual control is moved from its zero speed reference position and in one direction through said range, said motion transmitting means having a rotatable input element connected for rotation by said manual control and a rotatable output element connected to rotate said controller.

13. A power operated gun mounting comprising a rotatably mounted gun turret, servo motor driving means for rotating said turret, a rotatable controller for controlling the direction and speed of said motor having a substantially fixed ratio of motor speed to displacement of said controller from a central zero speed reference position, a rotatable manual control rotatable throughout a displacement range from a central zero speed reference position, and a reversible, non-linear gear transmission means responsive to said manual control for effecting a progressively greater ratio of displacement in its output to displacement of its input as said manual control is moved from its zero speed reference position and in one direction through said range, the input of said transmission being connected with said manual control and the output thereof being connected to rotate said controller.

CARL G. HOLSCHUH.
LESTER C. WARNER.

REFERENCES CITED

The following references are of record in the file of this patent:

UNITED STATES PATENTS

| Number | Name | Date |
|---|---|---|
| 2,182,722 | De Gavardie | Dec. 5, 1939 |
| 2,233,918 | Fey | Mar. 4, 1941 |
| 1,821,521 | Mackine | Sept. 1, 1931 |
| 1,897,282 | Steinle | Feb. 14, 1933 |
| 2,110,089 | Lempereur | Mar. 1, 1938 |
| 2,243,520 | Beharrell et al. | May 27, 1941 |
| 1,481,283 | Daniel | Jan. 22, 1924 |
| 1,951,921 | Blanchard | Mar. 20, 1934 |
| 2,196,269 | Morris | Apr. 9, 1940 |
| 2,034,223 | Brady | Mar. 17, 1936 |
| 2,304,566 | Haberlin | Dec. 8, 1942 |
| 2,316,926 | Willett | Apr. 20, 1943 |
| 2,164,306 | Bohringer | July 4, 1939 |
| 1,753,562 | Ferris | Apr. 8, 1930 |
| 1,296,303 | Manly | Mar. 4, 1919 |
| 463,977 | Allen | Nov. 24, 1891 |
| 407,487 | Maxim | July 23, 1889 |
| 1,360,664 | Miller | Nov. 30, 1920 |
| 1,387,678 | Anderson | Aug. 16, 1921 |
| 1,530,445 | Warren | Mar. 17, 1925 |
| 2,316,320 | Dewandre | Apr. 13, 1943 |

FOREIGN PATENTS

| Number | Country | Date |
|---|---|---|
| 461,824 | Great Britain | Feb. 25, 1937 |
| 489,208 | Great Britain | July 21, 1938 |
| 673,342 | France | Oct. 7, 1929 |
| 473,927 | Great Britain | Oct. 22, 1937 |
| 800,959 | France | May 11, 1936 |
| 787,298 | France | July 1, 1935 |
| 798,815 | France | Mar. 11, 1936 |
| 825,801 | France | Dec. 16, 1937 |